US012636228B2

(12) United States Patent
Raghu

(10) Patent No.: US 12,636,228 B2
(45) Date of Patent: May 26, 2026

(54) CONTAINER FOR MEDICATION PACKAGES

(71) Applicant: Shriram Raghu, Butner, NC (US)

(72) Inventor: Shriram Raghu, Butner, NC (US)

( * ) Notice: Subject to any disclaimer, the term of this patent is extended or adjusted under 35 U.S.C. 154(b) by 0 days.

(21) Appl. No.: 18/782,261

(22) Filed: Jul. 24, 2024

(65) Prior Publication Data

US 2026/0027010 A1 Jan. 29, 2026

(51) Int. Cl.

| | |
|---|---|
| ***A47F 5/02*** | (2006.01) |
| ***A61J 1/14*** | (2023.01) |
| ***A61J 1/16*** | (2023.01) |
| ***A61J 7/00*** | (2006.01) |

(52) U.S. Cl.

CPC ............... *A61J 1/16* (2013.01); *A61J 1/1412* (2013.01); *A61J 7/0069* (2013.01)

(58) Field of Classification Search

CPC .. A61J 7/04; A61J 1/03; A61J 2205/30; A61J 1/00; A61J 7/0084; A47F 5/02; A47F 7/0028; A47F 7/141; A61B 2050/3008; A61B 50/20; A61B 50/22; A61B 50/33; A61B 10/0096

USPC ........................................ 206/538, 581, 232

See application file for complete search history.

(56) References Cited

U.S. PATENT DOCUMENTS 6,047,833 A * 4/2000 Salomon ................ B65D 25/10 206/769

2009/0090835 A1* 4/2009 Harrison ................ A47G 23/08 248/346.03

* cited by examiner

*Primary Examiner* — King M Chu

(74) *Attorney, Agent, or Firm* — COATS & BENNETT, PLLC

(57) ABSTRACT

A container to hold medication packages. The container includes side walls and a bottom that extend around an interior space. The interior space has an opening that is opposite from the bottom. A platform extends upward from the bottom within the interior space. The platform includes a support configured to receive at least one of the medication packages. A storage area within the interior space extends between the platform, the side walls, and a floor. The storage area is configured to receive at least one of the medication packages. The floor of the storage area is positioned vertically below the support of the platform to enable the one or more medication packages positioned on the support to be elevated relative to the one or more medication packages positioned on the floor.

19 Claims, 14 Drawing Sheets

CONTAINER FOR MEDICATION PACKAGES

TECHNICAL FIELD

The present application is directed to a container and, more specifically, for a container configured to hold eye medication packages and configured for use by a patient with poor eyesight.

BACKGROUND

A variety of different medical procedures are commonly performed that affect the eyesight of a patient. One example includes laser eye surgery or laser vision correction. This procedure uses a laser or microkeratome to reshape the cornea to improve visual acuity. Another example is Photorefractive Keratectomy (PRK) which used a laser to remove and sculpt corneal tissue. Other examples include but are not limited to cataract removal surgery and various procedures that include eye dilation in which medication is applied to widen the pupils.

In the various procedures, the patient's eyesight is affected resulting in overall poorer vision. The affected eyesight can last for various lengths of time depending upon the procedure. This time of poor eyesight can be frustrating for a patient that is accustomed to having better vision. Further, this can be disorienting as the patient is not able to rely on their vision to determine what is happening in their surroundings.

The patient is often required to apply medication to their eyes after the medical procedure. The medication is often in a fluid form to be inserted into the patient's eyes. The medication can also include other forms, such as pills taken orally by the patient. The medication can include one or both of prescription medication (e.g., antibiotic fluid that is inserted into the eyes) and non-prescription medication (e.g., saline solution). The medication is stored in a package sized for either a single-dose package or multiple doses. The medication packages can be difficult to handle and administer by the patient themselves because of their poor eyesight. This is further compounded because the medication package can be relatively small and difficult to handle. One example of a relatively small medication package is a single-use vial of antibiotic fluid. The patient may have additional difficulty when required to simultaneously take multiple different medications.

A system to assist a patient in sorting and handling their medication is needed for this time period of poor eyesight. The system should be configured to allow the patient to identify and handle a medication package based on touch and feel since they cannot rely just on their eyesight.

SUMMARY

One aspect is directed to a container to hold medication packages. The container comprises side walls and a bottom that extend around an interior space. The interior space has an opening that is opposite from the bottom. A platform extends upward from the bottom within the interior space. The platform comprises a support configured to receive at least one of the medication packages. A storage area within the interior space extends between the platform, the side walls, and a floor. The storage area is configured to receive at least one of the medication packages. The floor of the storage area is positioned vertically below the support of the platform to enable the one or more medication packages positioned on the support to be elevated relative to the one or more medication packages positioned on the floor.

In another aspect, the platform is centered on the floor within the storage area In another aspect, the storage area extends completely around the platform.

In another aspect, the support comprises a slot that extends into a top surface of the platform with the slot configured to hold one of the medication packages.

In another aspect, one or more receptacles are offset from the interior space with each of the one or more receptacles comprising receptacle side walls 51 and a receptacle floor and with an opening with the opening is oriented in a common direction as the opening of the interior space.

In another aspect, the interior space is on a first section and the one or more receptacles are on a second section with the first section and the second section being independent pieces that are configured to be removably connected together.

In another aspect, the floor of the storage area comprises a first floor and a second floor at different vertical heights with each of the first floor and the second floor sized to hold one or more of the medication packages.

In another aspect, a cover comprises cover side walls and a top with the cover configured to be positioned with the cover side walls extending on an exterior side of the side walls and the top positioned over the opening of the interior space.

One aspect is directed to a container to hold medication packages. The container comprises a base comprising: an interior space with side walls, a floor at a lower section of the side walls, and an opening at an upper section of the side walls; a platform that extends upward from the floor with the platform comprising a support that is exposed at the opening and configured to receive at least one of the medication packages; and a storage area within the interior space adjacent to the platform with the storage area exposed at the opening and confined by the floor and the side walls with the storage area configured to support at least one of the medication packages. The support of the platform is positioned above the floor of the storage area to elevate the one or more medication packages on the support relative to the one or more medication packages on the floor of the storage area.

In another aspect, the base comprises a cylindrical shape with the side walls having a circular sectional shape.

In another aspect, the base comprises a unitary, one piece construction.

In another aspect, one or more receptacles are positioned on the base with each of the one or more receptacles comprising side walls, a floor, and an opening and are sized to support at least one of the medication packages with the one or more receptacles offset from the interior space.

In another aspect, the base comprises a first section with the interior space and a second section with the one or more receptacles, wherein the first section and the second section are separate pieces configured to be connected together.

In another aspect, a cover comprises side walls and a top with the cover configured to removably connect to the base and in a closed position the top extends over the opening of the interior space and the side walls of the cover are positioned along an exterior of the side walls of the base.

In another aspect, the top of the cover and the bottom of the base comprise a common shape.

One aspect is directed to a method of storing medication packages in a container. The method comprises: positioning a first medication package on a platform of the container;

supporting the first medication package with the platform in an upright orientation and at a first height within the container; positioning a second medication package on a floor of the container; and supporting the second medication package with the floor in the upright orientation at a second height within the container that is below the first medication package.

In another aspect, the method further comprises attaching a cover to a base and covering the first medication package and the second medication package.

The features, functions and advantages that have been discussed can be achieved independently in various aspects or may be combined in yet other aspects, further details of which can be seen with reference to the following description and the drawings.

DETAILED DESCRIPTION

The present application is directed to a container configured to hold medication packages. The container is designed to facilitate use by a patient that has poor eyesight. This includes positioning the medication packages in a manner in which the patient can differentiate between the different medication packages. The different medication packages can include the same and/or different medication.

Figure 1:
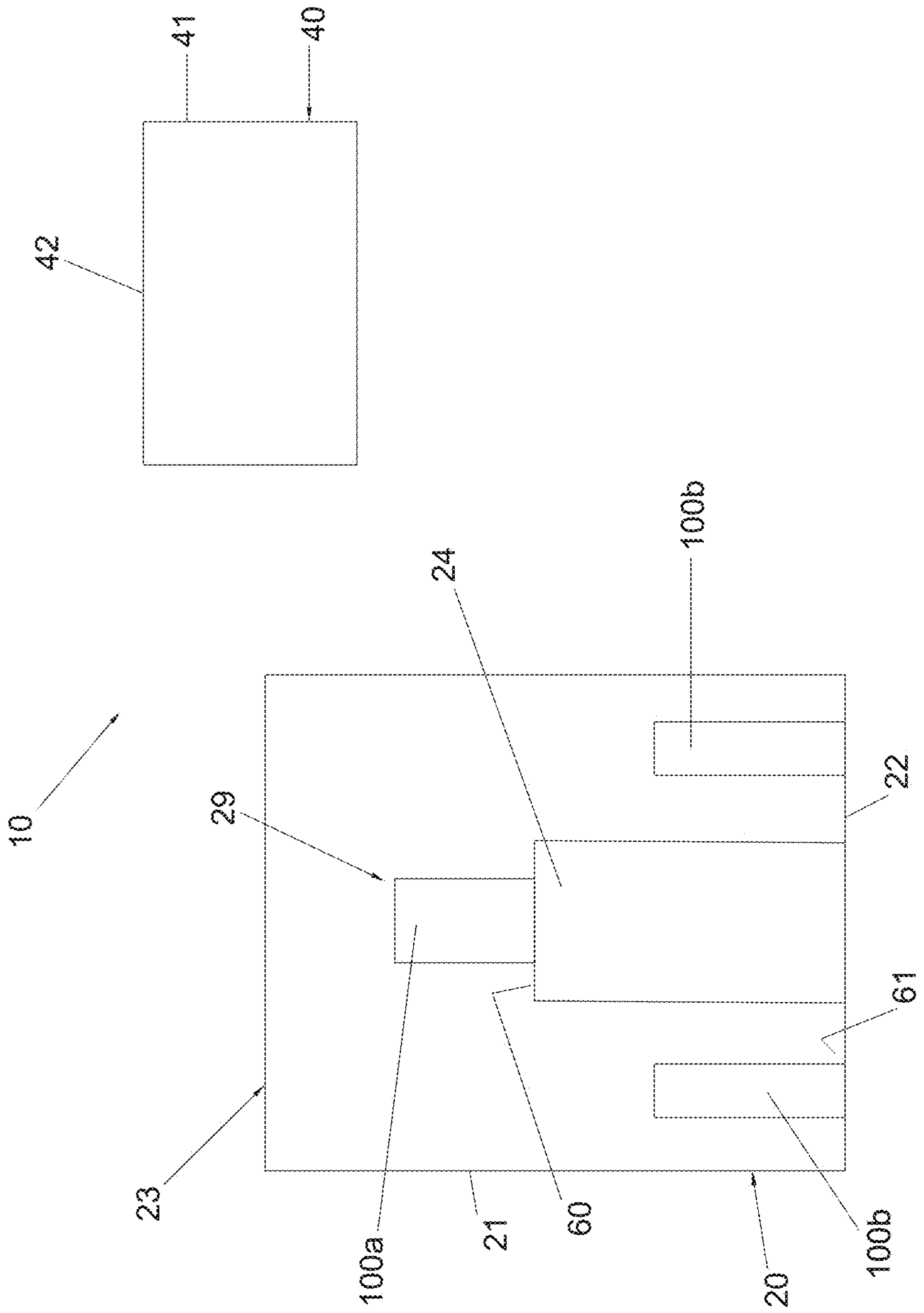
FIG. 1 is a schematic side view of a medication container with a base and a cover that is removed from the base.

FIG. 1 schematically illustrates a container 10. The container 10 includes a base 20 that has side walls 21 and a bottom 22. An open interior space 29 is formed within the base 20 and bounded by inner surfaces of the side walls 21 and a floor 61. The base 20 includes an opening 23 that leads into the interior space 29. A platform 24 extends upward from the floor 61 within the interior space 29. The platform 24 is configured to support one or more first medication packages 100*a*. The raised positioning of the platform 24 facilitates positioning the first medication package 100*a* to be readily accessed by the patient. The floor 61 enables supporting and positioning one or more second medication packages 100*b*. The bottom 22 locates the one or more second medication packages 100*b* at a lower position. The different vertical positioning enables the patient with poor eyesight to differentiate between the first and second medication packages 100*a*, 100*b*.

In some examples, the container 10 includes just the base 20. In other examples as illustrated in FIG. 1, the container 10 further includes a cover 40 configured to removably mate with the base 20. The cover 40 is configured to engage with the base 20 to enclose the interior space 29 and secure the medication packages 100. The cover 40 is also configured to be removed from the base 20 to allow access to the medication packages 100.

Figure 2:
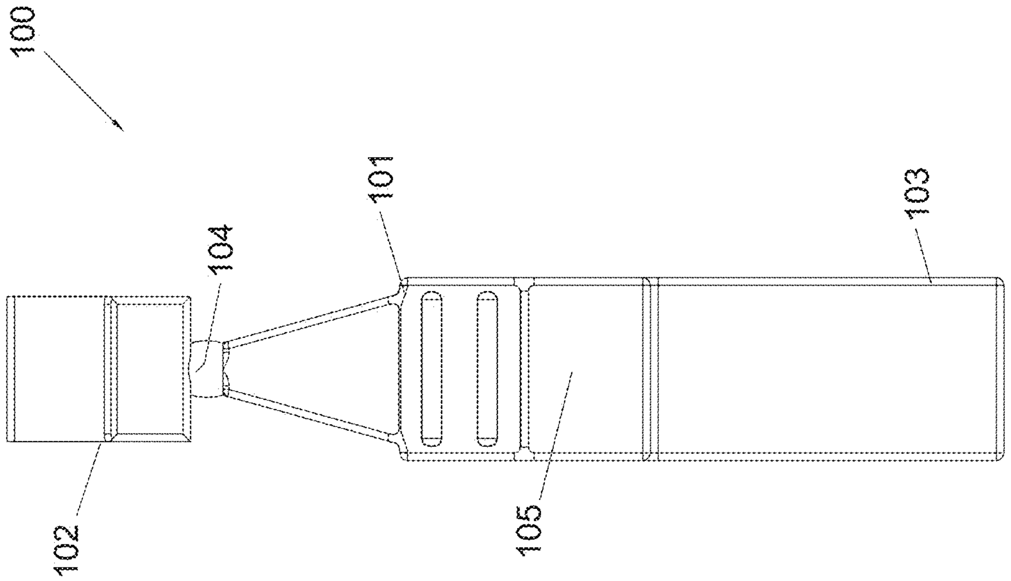
FIG. 2 is a side view of an example of a medication package.

The container 10 is applicable for use with a variety of different medication packages 100. FIG. 2 includes one example that includes a body 101 with a contained interior space 105 to hold a fluid. A cap 102 is attached to a body 101 to close an outlet 104. The cap 102 is configured to be twisted relative to the body 101 to be removed from the body 101 and open the outlet 104 to enable dispensing of the fluid medication. In some examples, this type of medication package 100 is a single-use package as the cap 102 is not able to be reattached to the body 101. In other examples, the medication package is multi-use with the cap 102 configured to be reattached, such as through a threaded connection or friction fit. Other examples of medication packages include but are not limited to sealed foil packs and blister packs.

The container 10 can be used in various manners. In some examples, the container 10 is used with just one type of medication package 100. An active medication package 100*a* is positioned on the platform 24, and one or more inactive medication packages 100*b* are positioned on the floor 61. For example, an open medication package 100*a* that still contains medication and can be used for subsequent applications is positioned on the platform 24, and unopened medication packages 100*b* are positioned on the floor 61. In other examples, the container 10 is used to differentiate between different types of medication packages 100. A first medication package 100*a* with a first configuration is positioned on the platform 24 and a second medication package 100*b* with a different configuration is positioned on the floor 61. In the various configurations, the medication package 100*a* on the platform 24 is elevated thus enabling the patient to differentiate and select the active medication package 100*a* from the other one or more medication packages 100*b*.

The platform 24 is sized to support different numbers of medication packages 100*a*. The number can vary from a single medication package 100*a*, to multiple medication packages 100*a*. Likewise, the floor 61 is sized to support different numbers of medications packages 100*a* ranging from a single package to multiple packages.

The container 10 positions the different medication packages 100 at different elevations. The medication packages 100*a* on the platform 24 are above the medication packages 100*b* on the floor 61. In some examples, this includes the positioning the top of the medication packages 100*a* above the top of the medication packages 100*b*. In some examples, this includes the entire medication packages 100*a* to be positioned above the medication packages 100*b*. This difference in elevation enables the patient to feel and differentiate the different medication packages 100.

Figure 3:
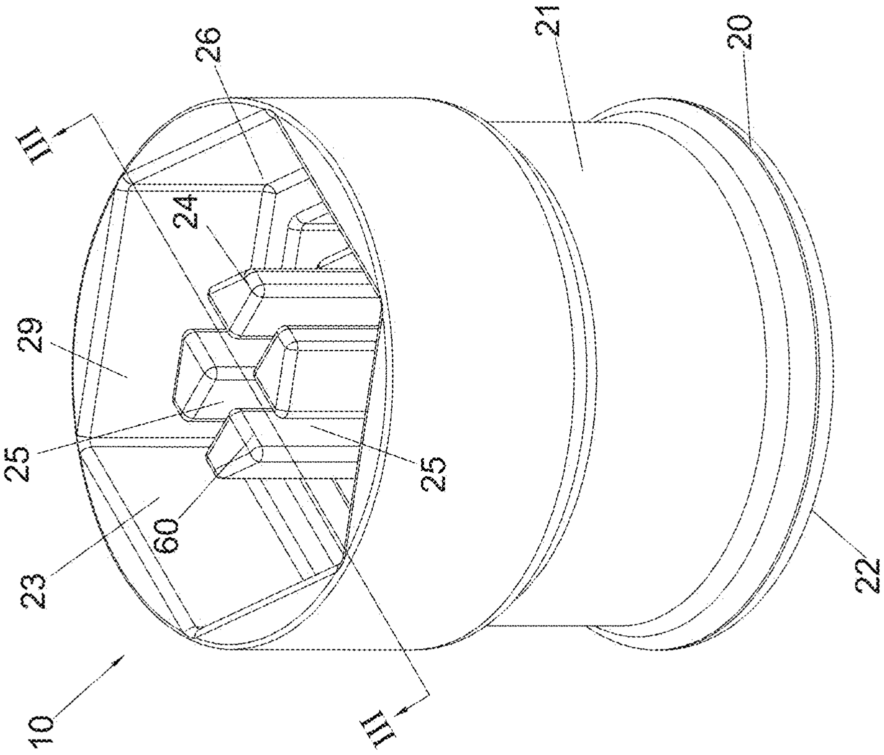
FIG. 3 is an isometric view of a container.
Figure 3A:
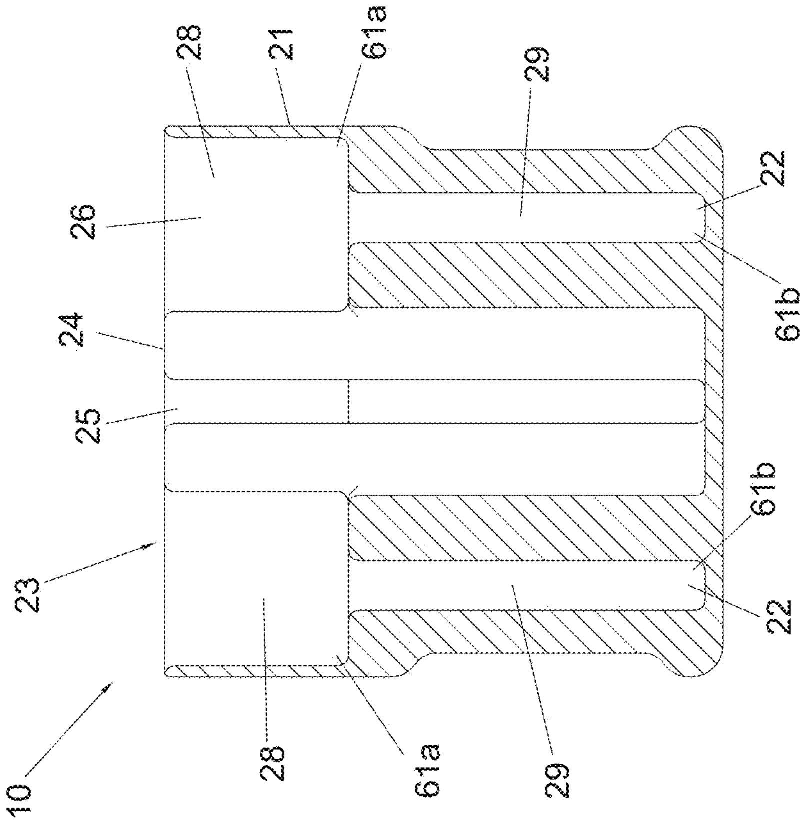
FIG. 3A is a section view of the container cut along line III-III of FIG. 3.

FIGS. 3 and 3A illustrate an example of a container 10. The container 10 includes an interior space 29 formed within side walls 21 and a bottom 22. The container 10 includes an opening 23 opposite from the bottom 22 to enable access to the interior space 29.

The platform 24 is positioned in the interior space 29. In some examples, the platform 24 is centered on the floor 61.

In other examples, the platform 24 is offset from the center. The platform 24 includes a support 60 to support and position one or more medication packages in the elevated position. In some examples, the support 60 is a top surface of the platform 24. In some examples, the top surface of the platform 24 is aligned with the top edge of the side walls 21. In other examples, the top surface of the platform 24 is recessed below or extends above the side walls 21.

In other examples as illustrated in FIGS. 3 and 3A, the support 60 includes one or more slots 25 that extend into the top surface of the platform 24. The one or more slots 25 are configured to support and position the medication packages 100. The slots 25 can position the medication packages 100 in a certain orientation. In some examples, the slots 25 are sized to hold a lower section 103 (see FIG. 2) of the body 101. This positions the outlet 104 upward to prevent the liquid from leaking from the interior space 105, such as when the cap 102 has been removed from the body 101. Further, the slots 25 enable the medication package 100 to extend outward above the top surface of the platform 24 to be more readily accessible to the patient.

A storage area 26 is formed within the interior space 29 adjacent to the platform 24. In some examples, the storage area 26 extends around the platform 24 with other examples including the storage area 26 is positioned at a limited section of the side of the platform 24. The storage area 26 is sized to contain the medication packages 100*b* that are not positioned on the platform 24. The storage area 26 includes a floor 61 that is positioned vertically below the top surface of the platform 24. This lower positioning recesses the one or more medication packages 100*b* relative to the one or more active medication packages 100*a*.

In some examples, the floor 61 includes a single section that is positioned at a constant vertical position throughout the interior space 29. In other examples as illustrated in FIG. 3A, the floor 61 includes two or more sections, such as an upper floor 61*a* and a lower floor 61*b*. Both floors 61*a*, 61*b* are positioned vertically below the top surface of the platform 24. The different floors 61*a*, 61*b* enable storing different sizes of medication packages 100. FIG. 3A includes an example with the storage area 26 including two floors 61*a*, 61*b*, with other examples including more than two different sections.

In some examples as illustrated in FIG. 3, the storage area 26 includes one or more flat sections along the outer wall. The flat sections are formed on the interior surfaces of the side walls 21. The flat sections enable positioning and spacing apart the different medication packages 100*b*. The flat sides can also provide tactile feedback to the patient when attempting to grasp one of the medication packages 100*b*.

Figure 4:
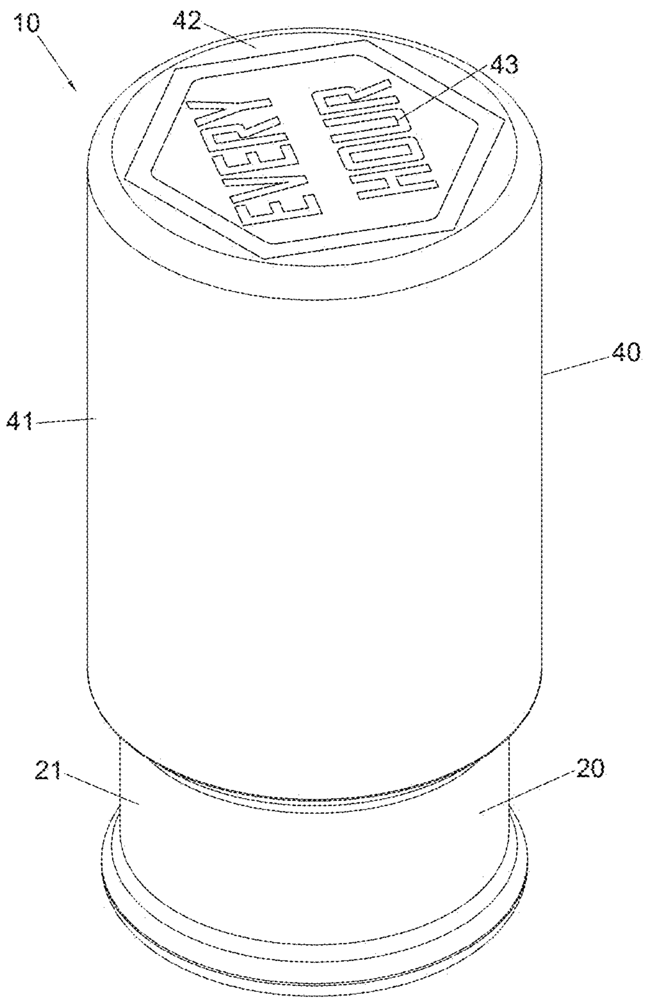
FIG. 4 is an isometric view of a container that includes a base and a cover.

In some examples, the container 10 includes just the base 20. The medication packages 100 remain exposed through the opening 23. In other examples as illustrated in FIG. 4, the container 10 also includes a cover 40 configured to removably engage with the base 20. The cover 40 includes side walls 41 sized to extend around the side walls 21 when the cover 40 is attached to the base 20. The cover 40 also includes a top 42 that extends over the opening 23 to fully enclose the interior space 29 when the cover 40 is attached to the base 20. The cover 40 can be configured to provide tactile feedback to the patient when attaching and detaching from the base 20. In some examples (not illustrated), the cover 40 and base 20 include ribs that move across each other during attachment and detachment of the cover 40 from the base 20 to provide tactile and/or audible feedback. Indicia 43, such as instructions for taking the medication, is printed on the top 42 to facilitate use of the medication. The indicia 43 can be in a font and/or color to enable viewing by the patient who is experiencing poor eyesight.

Figure 5:
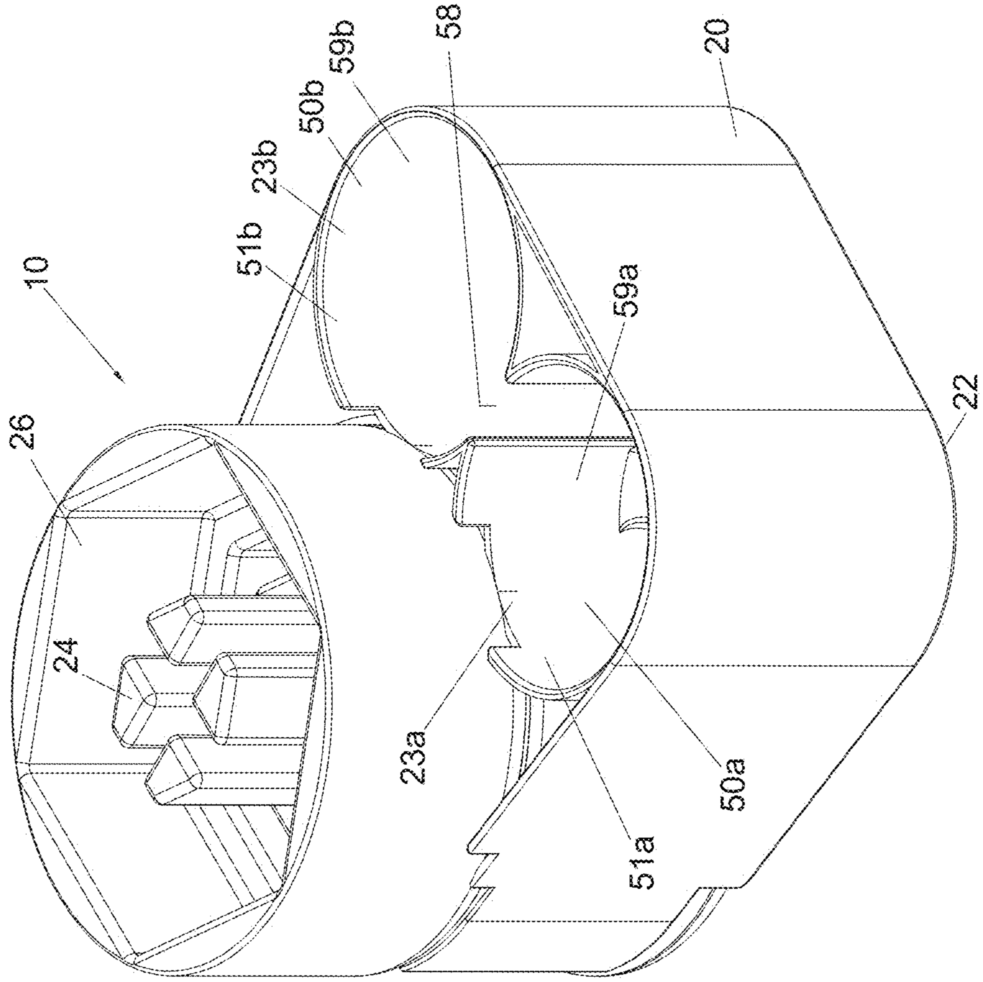
FIG. 5 is an isometric view of a container.

The container 10 can also include one or more additional receptacles 50 to hold other/additional medication packages, medication, supplies, etc. FIG. 5 illustrates a container 10 that includes a base 20 with a storage area 26 that includes the platform 24. The base 20 also includes additional receptacles 50*a*, 50*b*. The receptacles 50 include side walls 51 and a floor that extend around and form an interior space. The interior space includes an opening 59. In some examples, the opening 59 is aligned in a common direction as the opening 23 (e.g., both openings 23, 59 face upward when the base 20 is positioned on a surface).

In some examples with multiple receptacles 50, the interior spaces are completely separate. In other examples, a gap 58 is positioned between the different interior spaces.

Figure 5A:
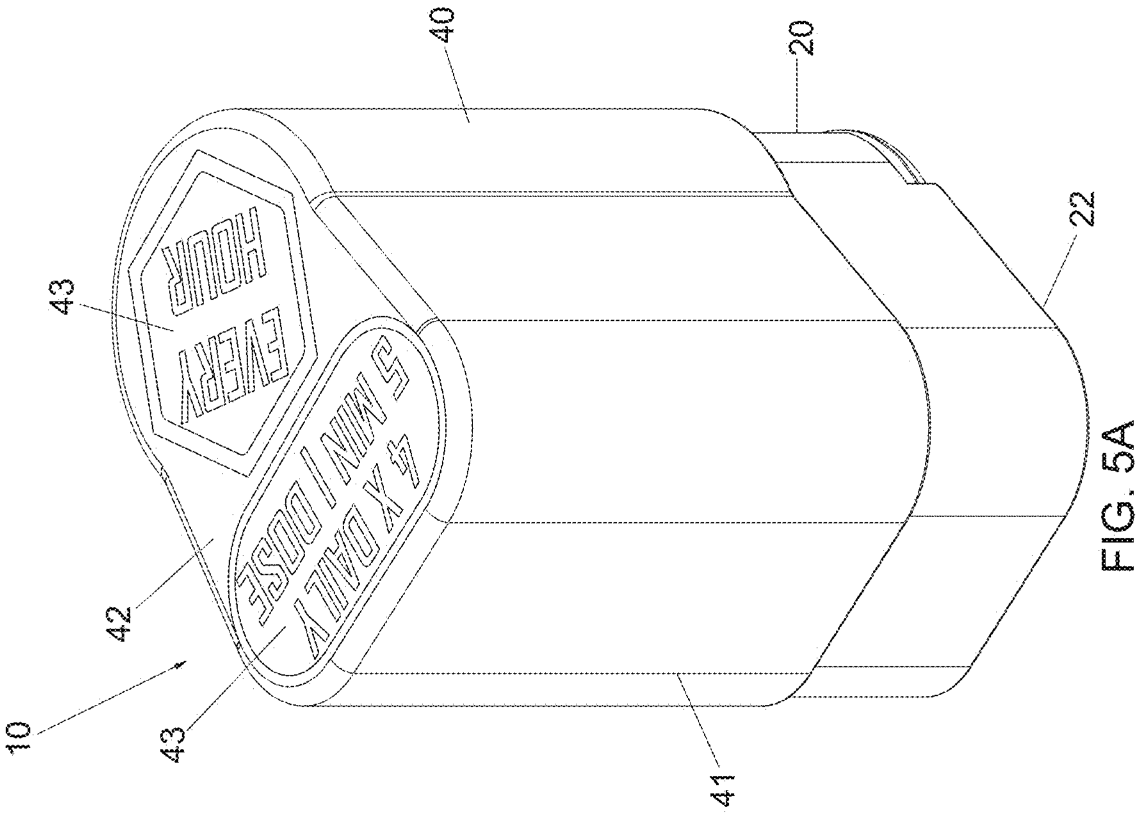
FIG. 5A is an isometric view of a container having a base and a cover.

In some examples with the base 20 having one or more receptacles 50, the cover 40 includes a corresponding shape and size. As illustrated in FIG. 5A, a cover 40 mates with the base 20 to extend over the storage area 26 and receptacles 50. In some examples, the side walls 41 are positioned over the base 20 to prevent debris from reaching the interior spaces where the medication packages 100 are located. In some examples, the top 42 of the cover and the bottom 22 of the base have the same sectional shape.

Figure 6:
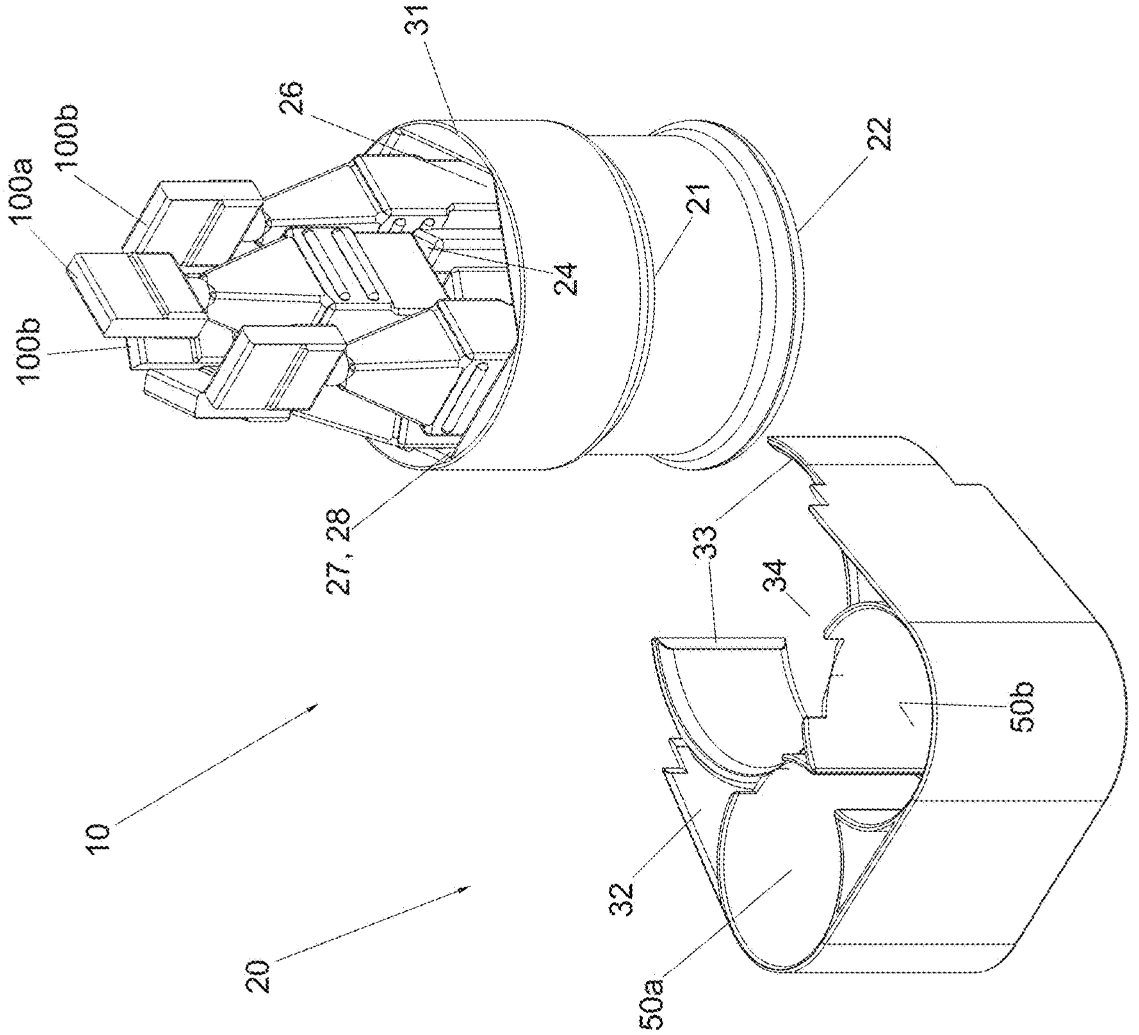
FIG. 6 is an isometric view of a container that includes a base having a first section and a separate second section.

In some examples as illustrated in FIG. 5, the base 20 has a one-piece unitary construction. In other examples, the base 20 is constructed from multiple pieces that are configured to connect together. FIG. 6 illustrates a base 20 that includes a first section 31 and a second section 32. The first section 31 is configured to hold the medication packages 100. In some examples, the first section 31 includes side walls 21 and a bottom 22 that extends around a storage area 26. A platform 24 is positioned in the storage area 26 and includes one or more sections 27, 28. In one example, the first section 31 is substantially the same as the container 10 in FIGS. 3 and 3A.

Figure 6A:
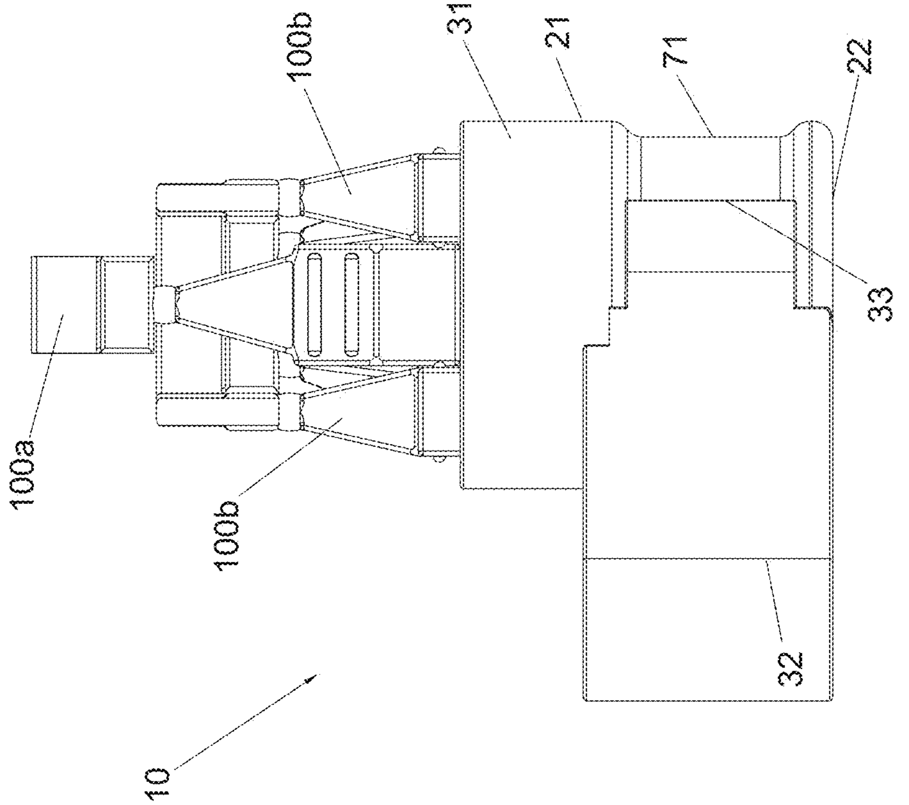
FIG. 6A is a side view of the container of FIG. 6 with the first section connected to the second section.

The second section 32 includes arms 33 that extend around a mounting position 34. The arms 33 are spaced apart and configured to extend around and engage with the first section 31. As illustrated in FIG. 6A, the first section 31 includes a recessed section 71 on the exterior of the side walls 21. The arms 33 are configured to engage with the recessed section 71 to engage with the first section 31. In some examples, the arms 33 are configured to expand outward when the first section 31 is inserted into the mounting position 34. Once positioned, the arms 33 retract to maintain the position of the first section 31 in the mounting position 34.

The second section 32 also includes one or more receptacles 50 to contain other items. In the example illustrated in FIG. 6, the second section 32 includes a pair of receptacles 50*a*, 50*b*. Other examples include the second section 32 having a single receptacle 50, or three or more receptacles 50.

Figure 7:
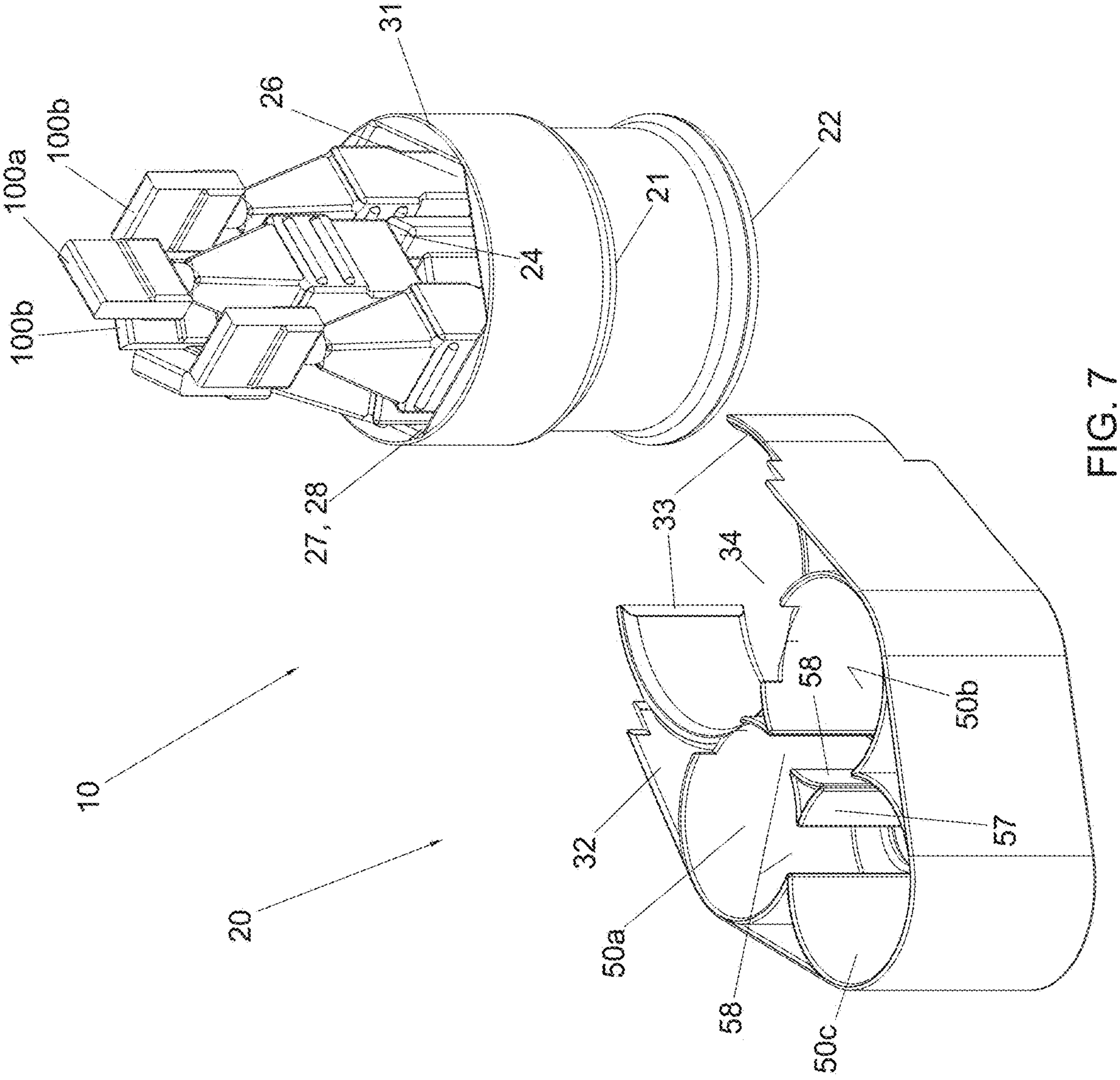
FIG. 7 is an isometric view of a container that includes a base having a first section and a separate second section.
Figure 7A:
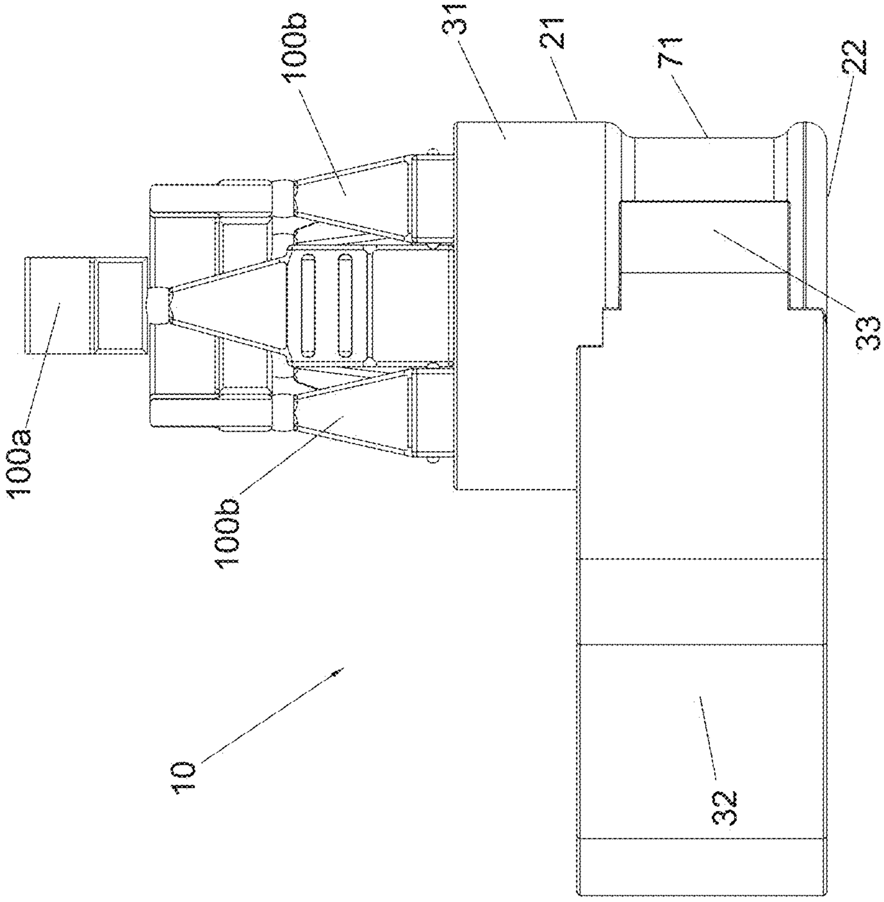
FIG. 7A is a side view of the container of FIG. 7 with the first section connected to the second section.

FIGS. 7 and 7A illustrate a two-piece container 10 that includes a first section 31 and a second section 32. The second section 32 includes three receptacles 50*a*, 50*b*, 50*c*. The sizes and shapes of the receptacles 50 can be the same (as illustrated in FIG. 7) or can be different. An intermediate divider 57 is positioned at the intersection of the receptacles 50. The divider 57 includes outer walls that face into one of the receptacles 50 and is shaped to correspond to the respective receptacle. In one example as illustrated in FIG. 7, the outer walls have a curved shape that matches the curvature of the outer walls of the receptacles 50. Gaps 58 are formed at the divider 57 between the different receptacles 50. As illustrated in FIG. 7A, the side walls 21 are formed by both sections 31, 32.

Figure 8:
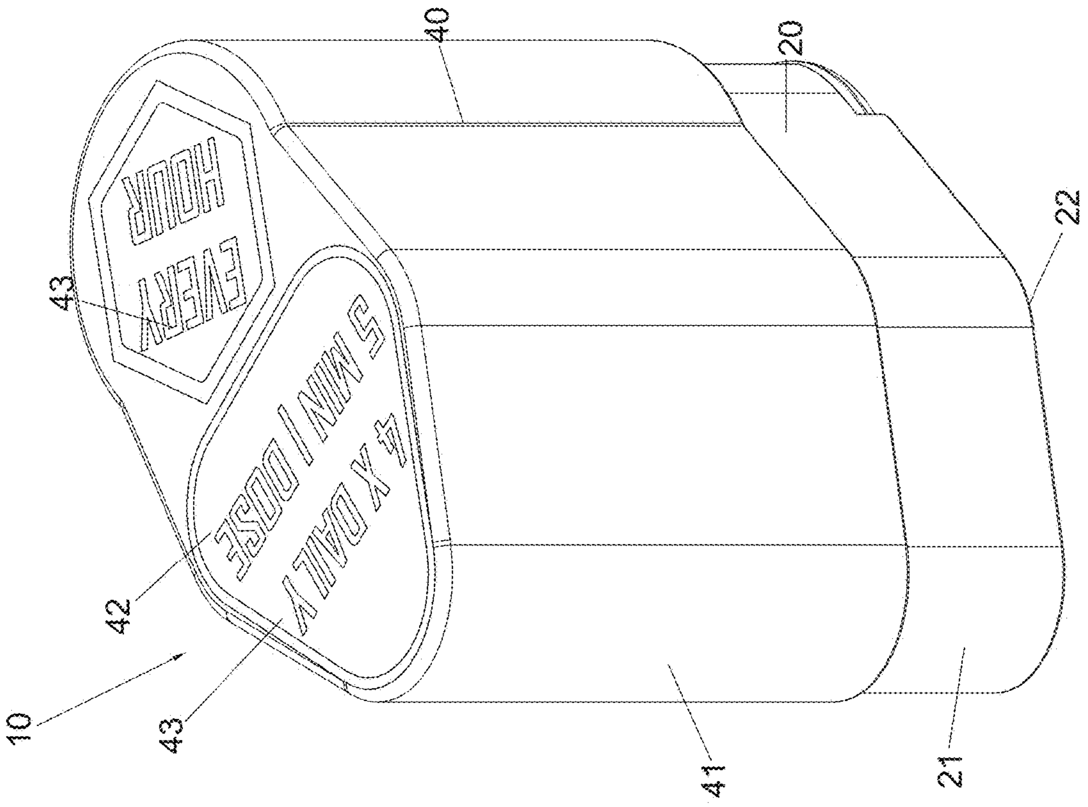
FIG. 8 is an isometric view of a container that includes a base and a cover.

FIG. 8 illustrates a container 10 that includes a base 20 and a cover 40. In one example, the base 20 is the same as base 20 in FIGS. 7 and 7A that includes multiple sections 31, 32. The cover 40 is sized to extend over the base 20 with side walls 41 that are on the exterior of the side walls 21 of the base 20. The cover 40 has a sectional shape that matches the shape of the base 20.

Figure 9:
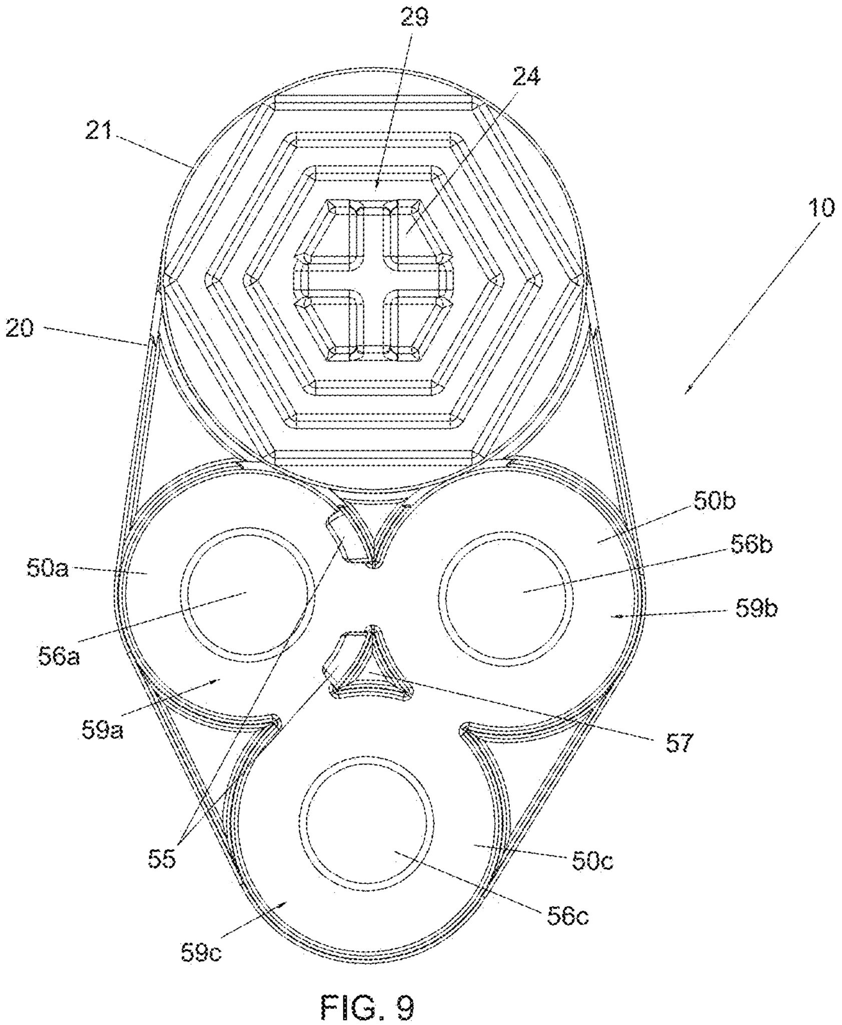
FIG. 9 is a top view of a base that includes multiple receptacles.

FIG. 9 is a top view of a base 20 that includes the interior space 29 and multiple receptacles 50. The base 20 can be constructed as a single unitary piece, or include multiple sections that are mounted together. The receptacles 50 include openings 56 in the bottom. The openings 56 facilitate removal of a medication package that is positioned in the receptacle 50. In one example, an item such as the user finger, a pencil, or other such structure can be inserted through the opening 56 from the bottom side of the base 20. This item contacts against the medication package and can facilitate removal from the receptacle 50.

In some examples, one or more extensions 55 extend upward from the floor of the receptacles 50. The extensions 55 extend upward a limited distance (e.g., ¼"). The extensions 55 can prevent a medication package from becoming stuck in the receptacle 50. The extensions 55 form a space between the side wall of the receptacle and the medication package. The extensions 55 can also enable different sizes of medication packages to be more securely stored in the receptacle 50.

Figure 10:
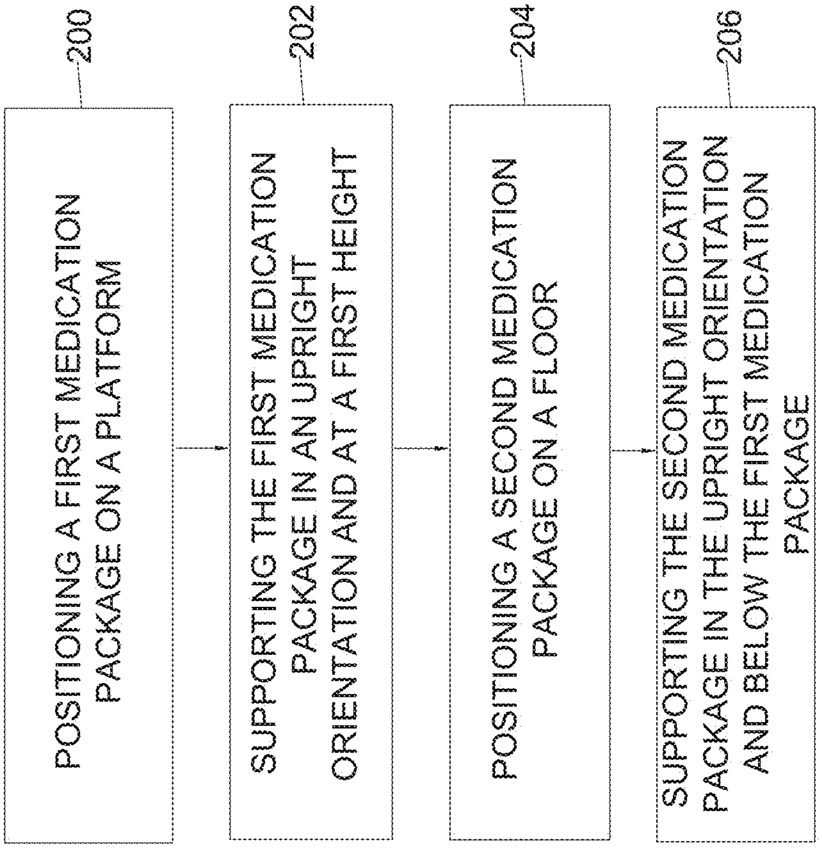
FIG. 10 is a flowchart diagram of a method of storing medication packages in a container.

FIG. 10 illustrates a method of storing medication packages 100 in a container 10. The method includes positioning a first medication package 100*a* on a platform 24 (block 200). The platform 24 supports the first medication package 100*a* in an upright orientation and at a first height (block 202). A second medication package 100*b* is positioned on a floor 61 (block 204). The second medication package 100*b* is supported by the floor 61 in the upright orientation and below the first medication package 100*a* (block 206). The lower positioning includes the top of the second medication package 100*b* being lower than the top of the first medication package 100*a*.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are second ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A container to hold medication packages, the container comprising:

side walls and a bottom that extend around an interior space, the interior space comprising an opening that is opposite from the bottom;

a platform that extends upward from the bottom within the interior space and is spaced inward away from the side walls, the platform comprising a top surface that forms a support configured to receive at least one of the medication packages, the top surface of the platform positioned vertically below the side walls;

a storage area within the interior space that extends between the platform, the side walls, and a floor, the storage area contained within the side walls and the bottom and configured to receive at least one of the medication packages; and wherein the floor of the storage area is positioned vertically below the support of the platform to enable the one or more medication packages positioned on the support to be elevated relative to the one or more medication packages positioned on the floor.

2. The container of claim 1, wherein the platform is centered on the floor within the storage area.

3. The container of claim 2, wherein the storage area extends completely around the platform.

4. The container of claim 1, wherein the support comprises a slot that extends into the top surface of the platform, the slot comprising a relatively narrow width and relatively long length, the slot configured to hold one of the medication packages.

5. The container of claim 1, further comprising one or more receptacles offset from the interior space, each of the one or more receptacles comprising receptacle side walls and a receptacle floor and with an opening, wherein the opening is oriented in a common direction as the opening of the interior space.

6. The container of claim 5, wherein the interior space is on a first section and the one or more receptacles are on a second section with the first section and the second section being independent pieces that are configured to be removably connected together.

7. The container of claim 5, further comprising extensions that extend upward a limited distance from a bottom of the one or more receptacles.

8. The container of claim 1, wherein the floor of the storage area comprises a first floor and a second floor at different vertical heights, each of the first floor and the second floor sized to hold one or more of the medication packages.

9. The container of claim 1, further comprising a cover comprising:

cover side walls;

a top; and wherein the cover is configured to be positioned with the cover side walls extending on an exterior side of the side walls and the top positioned over the opening of the interior space.

10. A container to hold medication packages, the container comprising:

a base comprising:

an interior space with side walls that extend completely around lateral sides of the interior space, a floor at a lower section of the side walls, and an opening at an upper section of the side walls;

a platform that extends upward from the floor and is positioned vertically below the side walls, the platform spaced away from the side walls and comprising a support that is exposed at the opening and configured to receive at least one of the medication packages;

a storage area within the interior space adjacent to the platform between the platform and the side walls, the storage area exposed at the opening and confined by the floor and the side walls, the storage area configured to support at least one of the medication packages; and wherein the support of the platform is positioned above the floor of the storage area to elevate the one or more medication packages on the support relative to the one or more medication packages on the floor of the storage area.

11. The container of claim 10, wherein the base comprises a cylindrical shape with the side walls having a circular sectional shape.

12. The container of claim 10, wherein the base comprises a unitary, one piece construction.

13. The container of claim 10, further comprising one or more receptacles positioned on the base, each of the one or more receptacles comprising side walls, a floor, and an opening and are sized to support at least one of the medication packages, wherein the one or more receptacles are offset from the interior space.

14. The container of claim 13, wherein the base comprises a first section with the interior space and a second section with the one or more receptacles, wherein the first section and the second section are separate pieces configured to be connected together.

15. The container of claim 10, further comprising a cover that comprises side walls and a top with the cover configured to removably connect to the base, wherein in a closed position the top extends over the opening of the interior space and the side walls of the cover are positioned along an exterior of the side walls of the base.

16. The container of claim 15, wherein the top of the cover and a bottom of the base comprise a common shape.

17. A method of storing medication packages in the container of claim 1, the method comprising:

positioning a first one of the medication packages on the platform of the container;

supporting the first medication package with the platform in an upright orientation and at a first height within the container;

positioning a second one of the medication packages on the floor of the container; and supporting the second medication package with the floor in the upright orientation at a second height within the container that is below the first medication package.

18. The method of claim 17, further comprising attaching a cover to a base comprising the side walls and the bottom and covering the first medication package and the second medication package.

19. The container of claim 4, wherein the slot is a first slot and further comprising a second slot that extends into the top surface of the platform, wherein the first slot and the second slot are aligned at opposing orientations and intersect along a central section of the platform.

* * * * *